United States Patent
Eguchi et al.

(10) Patent No.: US 8,129,863 B2
(45) Date of Patent: Mar. 6, 2012

(54) CONNECTION APPARATUS FOR PARALLEL RUNNING GENERATORS

(75) Inventors: Junichi Eguchi, Saitama (JP); Yoshinori Masubuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 213 days.

(21) Appl. No.: 12/489,057

(22) Filed: Jun. 22, 2009

(65) Prior Publication Data

US 2009/0318032 A1 Dec. 24, 2009

(30) Foreign Application Priority Data

Jun. 24, 2008 (JP) ................. 2008-164373

(51) Int. Cl.
*H02J 3/38* (2006.01)
(52) U.S. Cl. ........................................... 307/86
(58) Field of Classification Search ....... 307/86
See application file for complete search history.

(56) References Cited

U.S. PATENT DOCUMENTS

| | | | | |
|---|---|---|---|---|
| 3,582,669 | A | * | 6/1971 | Dempsey ................. 307/18 |
| 3,588,519 | A | * | 6/1971 | Luebrecht ................. 307/87 |
| 3,991,320 | A | * | 11/1976 | Ross ........................ 307/71 |
| 4,159,503 | A | * | 6/1979 | Ross ....................... 361/187 |
| 4,926,281 | A | * | 5/1990 | Murphy .................... 361/55 |
| 5,160,852 | A | * | 11/1992 | Charles et al. ........... 307/77 |
| 5,245,219 | A | * | 9/1993 | Romatzick et al. ...... 307/71 |
| 5,302,857 | A | * | 4/1994 | Charles et al. ........... 307/20 |
| 5,936,828 | A | * | 8/1999 | Nolan et al. ............ 361/167 |
| 6,184,593 | B1 | * | 2/2001 | Jungreis .................. 307/64 |
| 6,218,813 | B1 | * | 4/2001 | Davis ...................... 322/20 |
| 6,614,671 | B2 | * | 9/2003 | Thrap ..................... 363/67 |
| 7,528,504 | B2 | * | 5/2009 | Gerber .................... 307/71 |
| 2003/0107353 | A1 | * | 6/2003 | Nakamura et al. ..... 322/89 |
| 2004/0168654 | A1 | * | 9/2004 | Radtke ................... 123/2 |

FOREIGN PATENT DOCUMENTS

JP 2869905 B2 1/1999

* cited by examiner

*Primary Examiner* — Adi Amrany
(74) *Attorney, Agent, or Firm* — Arent Fox LLP

(57) ABSTRACT

In an apparatus for connecting two generators to run in parallel, having plugs connectable to each generator output socket, an output socket connected to an electrical load, conductive paths that connect the plugs to the output socket while merging to a common path at a junction before the output socket, and a switching circuit that opens/closes the conductive paths, there are equipped with a connecting path that interconnects the conductive paths before the junction, a dummy load installed at the connecting path and current sensors installed at each conductive path. Disconnection of the plug from the socket is detected from the detected currents and the conductive paths are opened not to connect the generators to the electrical load, thereby preventing an output of the other of the generators from appearing at the terminals of the disconnected plug, and further preventing misjudging current change of the instantaneous no load condition as plug disconnection.

4 Claims, 3 Drawing Sheets

GENERATOR A'S CROSS CURRENT

GENERATOR B'S CROSS CURRENT

LOAD PRESENT ⇒ ABSENT

GENERATOR A'S CROSS CURRENT

GENERATOR B'S CROSS CURRENT

PLUG Pa DISCONNECTED

GENERATOR A'S CROSS CURRENT

GENERATOR B'S CROSS CURRENT

C2

LOAD PRESENT ⇒ ABSENT

GENERATOR A'S CROSS CURRENT

C1

GENERATOR B'S CROSS CURRENT

CONNECTION APPARATUS FOR PARALLEL RUNNING GENERATORS

BACKGROUND OF THE INVENTION

1. Field of the Invention

This invention relates to a connection apparatus for parallel running generators, particularly to an apparatus for connecting a plurality of generators to run in parallel.

2. Description of the Related Art

When a plurality of, e.g. two, generators are run or operated in parallel, a problem is encountered that if a plug connected with an output socket of one of the generators disconnects, the output of the other generator appears at the terminals (blades) of the disconnected plug. It is known to deal with this problem by providing an apparatus having two plugs connectable with the output sockets of the two generators and one output socket connectable to an electrical load and by responding to disconnection of one of the plugs by breaking the connection between its ground terminal and a dedicated ground terminal so as to turn off the switch of a downstream relay, thereby preventing the output of the other generator from appearing at the terminals of the disconnected plug, as taught by Japanese Patent No. 2,869,905.

SUMMARY OF THE INVENTION

The prior art is configured to prevent the output of the other generator from appearing at the terminals of the disconnected plug by devising the structure. Since current flowing between the generators (i.e., cross current) disappears upon disconnection of the plug, it is also possible to cope with the problem by detecting the disappearance of current and opening a conductive path.

However, since the current flowing between the generators temporarily disappears also due to instantaneous load change, an instantaneous no load condition is likely to be misjudged as plug disconnection.

An object of this invention is therefore to overcome the foregoing problem by providing a connection apparatus for parallel running generators which, during parallel running of multiple interconnected generators, detects disconnection of a plug of one of the generators by detecting current flowing between the generators, thereby preventing an output of the other of the generators from appearing at the terminals of the disconnected plug, and further prevents misjudging current change of the instantaneous no load condition as plug disconnection.

In order to achieve the object, this invention provides an apparatus for connecting generators to run in parallel, comprising: plugs that are connectable to each generator output socket of the generators; an output socket that is adapted to be connected to an electrical load; conductive paths that connect the plugs to the output socket, the conductive paths are merged to a common path at a junction before the output socket; a connecting path that interconnects the conductive paths before the junction; a dummy load installed at the connecting path; a switching circuit that opens/closes the conductive paths; current sensors that are installed at each of the conductive paths to detect current flowing each of the conductive paths; a plug disconnection detector that detects disconnection of the plug from the generator output socket based on the currents detected by the current sensors; and a switching circuit operator that operates the switching circuit to open the conductive paths not to connect the generators to the electrical load when the disconnection of the plug is detected.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

Figure 1:
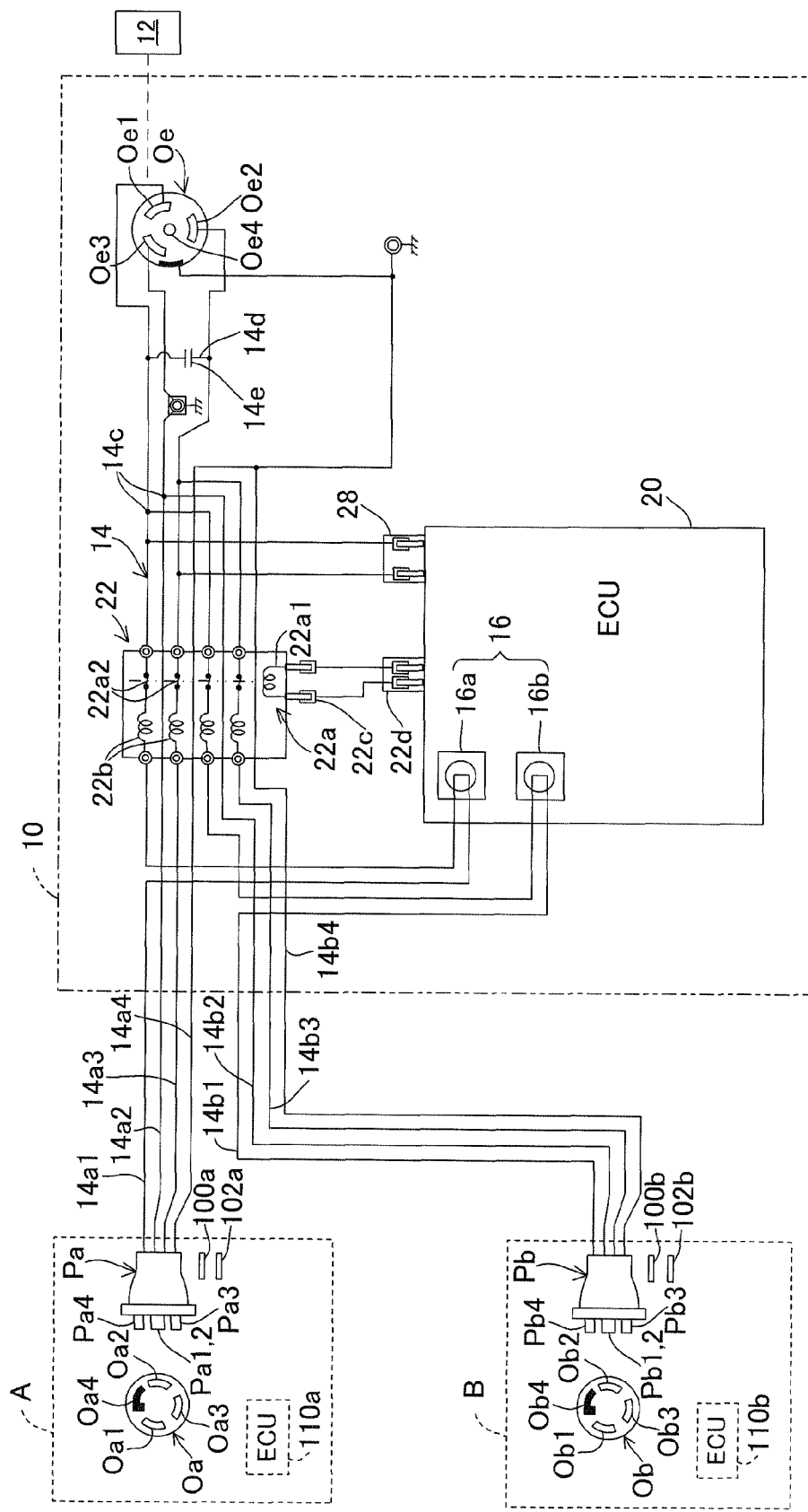
FIG. 1 is a block diagram giving an overview of a connection apparatus for parallel running generators according to an embodiment of this invention.

FIG. 1 is a block diagram giving an overview of a connection apparatus for parallel running generators according to an embodiment of this invention.

As illustrated, the apparatus (designated by reference numeral 10) is an apparatus for connecting a plurality of generators (two generators A and B in the illustrated configuration) for parallel running. The generators A and B are both driven by internal combustion engines started using recoil starters (not shown). The generators A and B are identical model units that, for example, produce single-phase alternating current outputs of around 4.5 kVA at 100 V/200 V.

The generators A and B are equipped with output sockets Oa and Ob for outputting power. The output socket Oa (Ob) is equipped with a single-phase, three-wire structure constituted of voltage terminals Oa1 and Oa2 (Ob1 and Ob2), and a neutral terminal Oa3 (Ob3) therebetween, plus a ground terminal Oa4 (Ob4).

The apparatus 10 is equipped with at least two plugs Pa and Pb connectable with the output sockets Oa and Ob of the generators A and B, respectively, at least one output socket Oe connectable to an electrical load 12, conductive paths 14$an$, 14$bn$ capable of connecting the generators A and B to the electrical load 12, current sensors 16$a$, 16$b$ for detecting current flowing through the conductive paths 14$an$, 14$bn$ on the downstream side of junctions 14$c$, an electronic control unit (ECU) 20 comprising a microcomputer, and a switching circuit 22 for opening and closing the conductive paths 14.

The foregoing components are explained below in detail.

The plug Pa (Pb), which is configured complementary to the output socket Oa (Ob) of the generator A (B), is equipped with a single-phase, three-wire structure constituted of voltage terminals Pa1 and Pa2 (Pb1 and Pb2), and a neutral terminal Pa3 (Pb3) therebetween, plus a ground terminal Pa4 (Pb4). The plugs Pa and Pb and the output sockets Oa and Ob of the generators A and B have ordinary conventional structures.

Similarly to the output sockets Oa and Ob on the generator side, the output socket Oe of the apparatus 10 is equipped with a single-phase, three-wire structure constituted of voltage terminals Oe1 and Oe2, and a neutral terminal Oe3 therebetween, plus a ground terminal Oe4. The output socket Oe is connected to the electrical load 12 by inserting the plug (not shown) of the electrical load 12 into output socket Oe.

The conductive paths 14$an$, 14$bn$ connect the plugs Pa and Pb with the output socket Oe. They are configured to receive the outputs of the generators A and B through the plugs Pa and Pb and send them to the electrical load 12 through the output socket Oe. Specifically, the conductive paths 14an, 14bn comprise conductive paths (high-voltage wires) 14a1 and 14b1 for interconnecting the voltage terminals on the high-voltage side, conductive paths (low-voltage wires) 14a2 and 14b2 for interconnecting the voltage terminals on the low-voltage side, conductive paths (neutral wires) 14a3 and 14b3 for interconnecting the neutral terminals, and conductive paths (ground wires) 14a4 and 14b4 for interconnecting the ground terminals.

The conductive paths 14a1, 14b1, 14a2, 14b2, 14a3, 14b3, 14a4, 14b4 are connected (merged) at junctions 14c, whereby the conductive paths (common conductive path) 14 are from thereon reduced to the conductive path (high voltage wire) 14a1, conductive path (low-voltage wire) 14a2, conductive path (neutral wire) 14a3, and conductive path (ground wire) 14a4, so that the power outputs of the generators A and B are integrated and sent to the socket Oe thereby.

A connecting path 14d is provided to the conductive paths 14an, 14bn on downstream of the contacts 14c for interconnecting the conductive paths 14an, 14bn, specifically the conductive paths 14a1, 14a3. The connecting path 14d is installed with a dummy or pseudo load 14e that comprises a capacitor.

The current sensors 16a and 16b are connected (installed) in the conductive paths 14, specifically in the conductive paths 14a1 and 14b1 on the upstream side of the switching circuit 22. The current sensors 16a and 16b produce outputs based on the current (cross current) flowing from one of the plugs Pa and Pb to the other thereof (i.e., detect the current flowing between the generators A, B through the conductive paths 14a1, 14b1 and connecting path 14d) and forward the outputs to the ECU 20.

The switching circuit 22 is inserted in the conductive paths 14 on the upstream side of the junctions 14c. It is equipped with a relay 22a comprising a coil 22a1 and contacts 22a2 inserted in the conductive paths 14a1, 14b, 14a3 and 14b3. The contacts 22a2 of the relay 22a are normally closed. They remain closed to send the output of the generators A and B to the output socket Oe so long as the coil 22a1 is demagnetized.

When the coil 22a1 is magnetized (i.e., the relay 22a is turned ON), the contacts 22a2 open to open the conductive path 14. As a result, supply of the output of the generators A and B to the output socket Oe is prevented. The contacts 22a2 can also be opened manually. The switching circuit 22 is provided upstream of the contacts 22a2 with coils 22b for detecting over-current. The coil 22a1 of the relay 22a of the switching circuit 22 is connected to the ECU 20 through connectors 22c and 22d.

The small double circles on opposite sides of the switching circuit 22 indicate terminals. A breaker (not shown) installed downstream of the switching circuit 22 opens the conductive paths 14 when the electrical load 12 is overloaded owing to over-current or the like.

An operating power generation circuit (not shown) is provided between the conductive paths 14a1, 14a3 and terminals 28. The operating power generation circuit converts the AC 240 V voltage across the terminals of the conductive paths 14a1 and 14a2 to 12 V and 5 V direct current for supplying to the ECU 20 etc. as operating power.

The ECU 20 functions as a plug disconnection detector that detects disconnection of the plug Pa or plug Pb based on the current detected by the current sensors 16, and as a switching circuit operator that opens the conductive paths 14 when plug disconnection is detected.

Figure 2:
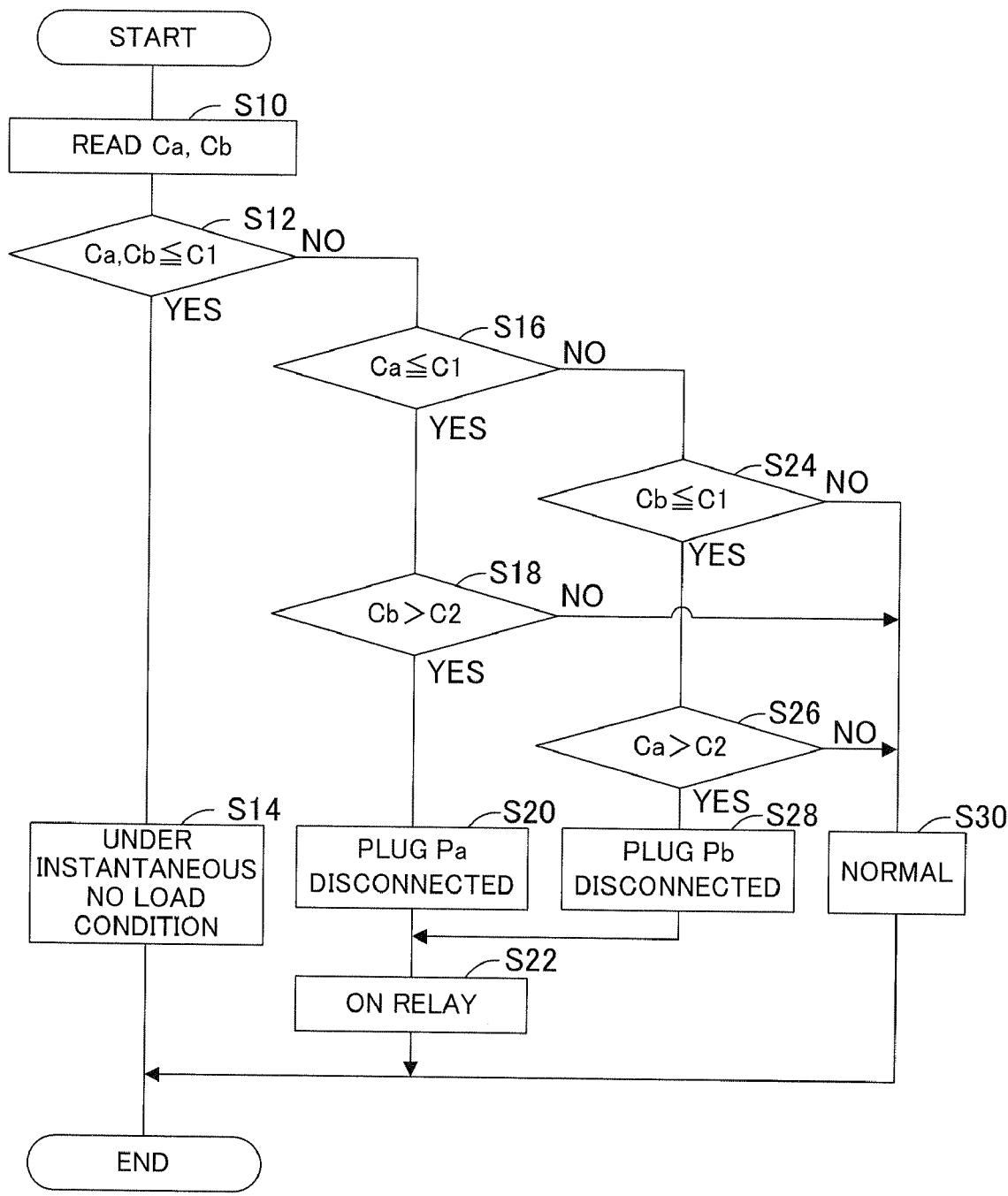
FIG. 2 is a flowchart showing the sequence of operations of the ECU shown in FIG. 1.

FIG. 2 is a flowchart showing the sequence of operations of the ECU 20 as the plug disconnection detector and the conductive path opener and FIG. 3 is a time chart for explaining the operations thereof. The program shown in FIG. 2 is executed by the ECU 20 at every 10 to 20 milliseconds.

The program begins in S10, in which detected values Ca, Cb of the current sensors 16a, 16b are read.

Before continuing the explanation on FIG. 2 flowchart, the object of this invention will be again explained with reference to FIG. 3.

Figure 3A:
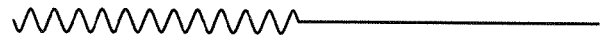
FIG. 3A to 3D are set of time charts for explaining the operations of FIG. 2.
Figure 3A:
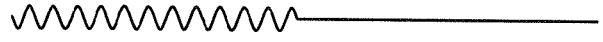
Figure 3B:
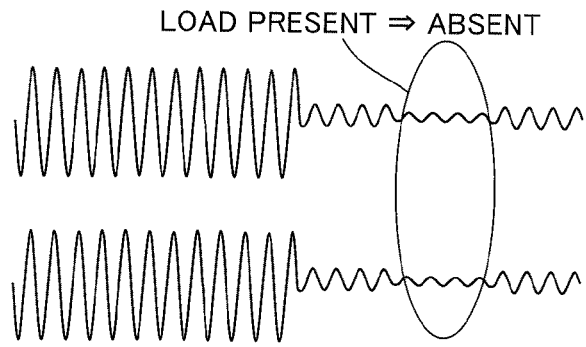

As shown in FIG. 3A, since the current flowing between the generators (cross current) disappears in response to disconnection of the plug from the generator output socket, plug disconnection can be detected based thereon. However, as shown in FIG. 3B, the current flowing between the generators temporarily disappears also due to instantaneous load change, and hence an instantaneous no load condition is likely to be misjudged as plug disconnection.

Therefore, this embodiment is configured such that the conductive paths 14 are interconnected through the connecting path 14d on downstream of the junctions 14c of the conductive paths 14a1, 14b1 and the connecting path 14d is installed with the dummy load (capacitor) 14e.

Figure 3C:
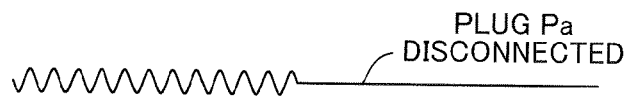
Figure 3C:
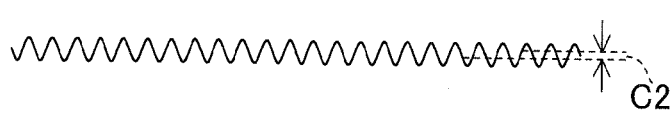

Owing to this arrangement, as shown in FIG. 3C, in the case where one of the plugs, e.g., the plug Pa is disconnected from the concerned output socket of the generator (generators A), although the current flowing through the conductive path 14a of the generator A side becomes zero, the current still flows to the other generator (i.e., the generator B) through the dummy load 14e. As a result, the detected values of the current sensors 16 are increased.

Specifically, the current corresponding to a quotient obtained by dividing voltage by capacitive reactance Xc of the capacitor flows through the dummy load 14e of the connecting path 14d, and the detected values of the current sensors 16a, 16b are increased by that amount.

Figure 3D:
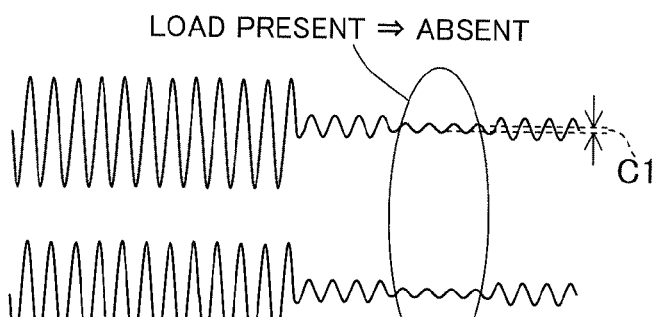

In contrast, in the instantaneous no load condition, since both currents become zero or almost zero as shown in FIG. 3D, it becomes possible to clearly discriminate the detected status from the case of plug disconnection and to prevent misjudging the instantaneous no load condition as plug disconnection.

On the premise of the above facts, the explanation on FIG. 2 flowchart is resumed.

As mentioned in the foregoing, in S10, the detected values Ca, Cb of the current sensors 16a, 16b are read. Here, the detected value means an effective value of the current (root-mean-square current, i.e., the square root of the time average of the square of the instantaneous value) obtained based on the output of the current sensor 16. The detected values Ca and Cb are obtained based on the outputs of the current sensors 16a and 16b, respectively.

Assuming the output of the generators A, B as single-phase alternating current of around 4.5 kVA at 100 V/200 V as mentioned above, capacitance of the capacitor constituting the dummy load 14e is 1.5 pF, for instance.

The program next proceeds to S12, in which it is determined whether the detected values Ca, Cb are both less than a value C1. As shown in FIG. 3D, the value C1 is set to a value slightly greater than the effective current under the instantaneous no load condition. Specifically, the determination in S12 amounts to determining whether it is under the condition shown in FIG. 3D.

When the result in S12 is Yes, the program proceeds to S14, in which it is determined that the electrical load 12 is instantaneously or temporarily in the no load condition and plug disconnection does not occur, and the program is terminated.

On the other hand, when the result in S12 is No, the program proceeds to S16, in which it is determined whether the detected value Ca is equal to or less than the value C1 and when the result is Yes, to S18, in which it is determined whether the detected value Cb is greater than a value C2. As shown in FIG. 3C, the value C2 is set to the effective current or thereabout which, when the plug connected to one of the generators A, B is disconnected, is detected by the current sensor 16 of the other of the generators.

When the result in S18 is Yes, since it means that it is under the condition shown in FIG. 3C, the program proceeds to S20, in which it is determined that the plug Pa connected to the generator A is disconnected, and to S22, in which the relay 22a is turned ON. Specifically, the coil 22a1 is magnetized.

Thus, the contacts 22a2 of the switching circuit 22 are opened to open the conductive paths 14. As a result, the generators A, B are prevented from connecting to the electrical load 12, while the output of one of the generators A, B is prevented from appearing at the disconnected plug (Pb or Pa) of the other of the generators.

When the result in S16 is No, the program proceeds to S24, in which it is determined whether the detected value Cb is equal to or less than the value C1 and when the result is Yes, to S26, in which it is determined whether the detected value Ca is greater than the value C2. When the result in S26 is Yes, the program proceeds to S28, in which it is determined that the plug Pb connected to the generator B is disconnected and to S22, in which the relay 22a is turned ON.

When the result in S24 or S26 is No, the program proceeds to S30, in which it is determined to be normal, i.e., no plug disconnection occurs. When the result in S18 is No, although the output current of at least one of the generators decreases because the result in S16 is affirmative, the determination on plug disconnection can not be made. Therefore, the program proceeds to S30. The foregoing processing is repeated at every 10 to 20 milliseconds.

It should be noted that, in the foregoing embodiment, although the dummy load 14e comprises the capacitor, a coil or a resistor can instead be used as the dummy load 14e. In the case of utilizing the coil, current corresponding to the quotient obtained by dividing voltage by inductive reactance flows through the dummy load 14e, whereby the detected values of the current sensors 16a, 16b are increased by that amount. The same can be applied for the resistor. However, since the use of the resistor generates heat, the capacitor or some similar element will be preferable.

As stated above, the embodiment is configured to have an apparatus (10) for connecting generators (A, B) to run in parallel, comprising: plugs (Pa, Pb) that are connectable to each generator output socket (Oa, Ob) of the generators (A, B); an output socket (Oe) that is adapted to be connected to an electrical load (12); conductive paths (14an, 14bn) that connect the plugs (Pa, Pb) to the output socket (Oe), the conductive paths are merged to a common path (14) at a junction (14c) before the output socket (Oe); a connecting path (14d) that interconnects the conductive paths before the junction; a dummy load (14e) installed at the connecting path; a switching circuit (22) that opens/closes the conductive paths; current sensors (16a, 16b) that are installed at each of the conductive paths to detect current flowing each (14an, 14bn) of the conductive paths; a plug disconnection detector (ECU 20, S10 to S20, S24 to S30) that detects disconnection of the plug from the generator output socket based on the currents detected by the current sensors; and a switching circuit operator (ECU 20, S22) that operates the switching circuit to open the conductive paths not to connect the generators to the electrical load when the disconnection of the plug is detected.

Specifically, the plug disconnection detector determines whether the detected current of one of the generators is equal to or less than a first value (C1) indicative of current under instantaneous no load condition (S16, S24), and when the result is affirmative, determines whether the detected current of other of the generators is greater than a second value (C2) indicative of current at the disconnection of the plug (S18, S26), and determines that one of the plugs connected to the generator output socket of the other of the generator is disconnected when the result is affirmative (S20, S28).

With this, since it is configured to detect disconnection of the plug Pa, Pb of one of the generators A, B based on current flowing between the generators and open the conductive paths 14an, 14bn, it becomes possible to prevent an output of the other of the generators from appearing at the terminals of the disconnected plug.

In the system, the connecting path 14d is provided to the conductive paths 14an, 14bn on downstream of the contacts 14c for interconnecting the conductive paths, and is installed with the dummy load 14e. Owing to this configuration, in the case where the plug of one of the generators A, B is disconnected, although the current flowing through the conductive path for the one generator becomes zero, the current still flows through the conductive path of the other of the generators through the dummy load 14e. With this, it becomes possible to clearly discriminate the detected current status from the case of instantaneous no load condition in which both currents become zero or almost zero, thereby enabling to prevent misjudging the instantaneous no load condition as plug disconnection.

In the system, the dummy load (14d) comprises a capacitor. With this, in addition to the above effects, it is beneficial compared to the case of utilizing a resistor as an element for increasing impedance because no heat is generated.

It should be noted that, in the foregoing embodiment, although the explanation is made on the case where the two generators A, B are operated in parallel, this invention can be applied to the parallel operation of three or more interconnected generators.

Japanese Patent Application No. 2008-164373 filed on Jun. 24, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for connecting a plurality of generators to run in parallel, comprising:
   a plurality of plugs, each plug being connected to a generator output socket of a corresponding generator, wherein the plurality of generators are driven by internal combustion engines and produce single-phase current outputs;
   an output socket that is adapted to be connected to an electrical load;
   conductive paths that connect the plugs to the output socket, the conductive paths are merged to a common path at a junction before the output socket;
   a connecting path that interconnects the conductive paths downstream of the junction;
   a dummy load installed on the connecting path;
   a switching circuit that opens/closes the conductive paths;
   current sensors that are installed at each of the conductive paths to detect current flowing through the dummy load in each of the conductive paths;
   a plug disconnection detector that determines whether a first detected current of one of the generators is equal to or less than a first value indicative of a first current flowing through the dummy load when the electrical load becomes zero, and when the result is affirmative, determines whether a second detected current of the other of the generators through the dummy load is greater than a second value indicative of a second current when the plug connected to the one of the generators is disconnected, and determines that one of the plugs connected to the generator output socket of the other of the generators is disconnected when the result is affirmative; and a switching circuit operator that operates the switching circuit to open the conductive paths not to connect the generators to the electrical load when the disconnection of the plug is detected.

2. The apparatus according to claim 1, wherein the dummy load comprises a capacitor.

3. The apparatus according to claim 2, wherein the second value corresponds to a quotient obtained by dividing a voltage provided by one of the generators by a capacitive reactance of the capacitor.

4. The apparatus according to claim 1, wherein the number of the plurality of generators is two.

* * * * *